United States Patent
Guepratte et al.

(10) Patent No.: US 10,044,279 B2
(45) Date of Patent: Aug. 7, 2018

(54) MULTI-OUTPUT POWER CONVERTER WITH PHASE-SHIFT CONTROL

(71) Applicant: THALES, Courbevoie (FR)

(72) Inventors: Kevin Guepratte, Brest (FR); Hervé Stephan, Brest (FR)

(73) Assignee: THALES, Courbevoie (FR)

( * ) Notice: Subject to any disclaimer, the term of this patent is extended or adjusted under 35 U.S.C. 154(b) by 91 days.

(21) Appl. No.: 15/107,429

(22) PCT Filed: Dec. 29, 2014

(86) PCT No.: PCT/EP2014/079361
§ 371 (c)(1),
(2) Date: Jun. 22, 2016

(87) PCT Pub. No.: WO2015/101594
PCT Pub. Date: Jul. 9, 2015

(65) Prior Publication Data
US 2017/0005584 A1    Jan. 5, 2017

(30) Foreign Application Priority Data

Dec. 31, 2013 (FR) ................................. 13 03118

(51) Int. Cl.
*H02J 1/10* (2006.01)
*H02J 3/46* (2006.01)
(Continued)

(52) U.S. Cl.
CPC ....... *H02M 3/33561* (2013.01); *H02M 3/335* (2013.01); *H02M 3/33523* (2013.01); *H02M 3/33584* (2013.01); *H02M 2003/1586* (2013.01)

(58) Field of Classification Search
CPC ............. H02M 3/33561; H02M 3/335; H02M 3/33523; H02M 3/33584; H02M 2003/1586
(Continued)

(56) References Cited

U.S. PATENT DOCUMENTS

| 4,323,962 A * | 4/1982 | Steigerwald | .......... H02M 7/217 307/34 |
| 8,736,102 B1 * | 5/2014 | Gao | ........................ H02M 3/28 307/17 |
| 2008/0253150 A1 * | 10/2008 | Wingrove | ......... H02M 3/33592 363/21.14 |

OTHER PUBLICATIONS

H. Krishnaswami et al., "A current-fed three-port bi-directional DC-DC converter," 29th International Telecommunications Energy Conference, Sep. 30, 2007, pp. 523-526, XP031228894.
(Continued)

*Primary Examiner* — Carlos Amaya
(74) *Attorney, Agent, or Firm* — Baker & Hostetler LLP

(57) ABSTRACT

A multi-output power conversion circuit employing phase-shift control, receiving at the input a DC voltage and supplying at the output a plurality of modulatable DC voltages, the circuit comprises a transformer having an input and a plurality of outputs, the input being connected to an inverter including at least two switches and configured to convert a DC voltage into an AC voltage and each output being connected to a controlled rectifier configured to convert an AC voltage into a DC voltage, each controlled rectifier including a magnetic storage inductance connected to an AC to DC converter including at least two switches, the power conversion circuit further including a control module configured to generate phase-shifted control signals adapted to control the switching of the switches of the inverter and the controlled rectifiers.

11 Claims, 3 Drawing Sheets

(51) Int. Cl.
*H02M 3/335* (2006.01)
*H02M 3/158* (2006.01)
(58) Field of Classification Search
USPC .......................................................... 307/24
See application file for complete search history.

(56) References Cited

OTHER PUBLICATIONS

S. Hazra et al., "A novel control principle for a high frequency transformer based multiport converter for integration of renewable energy sources," 39th Annual Conference of the IEEE Industrial Electronics Society, Nov. 10, 2013, pp. 7984-7989, XP032538719.
H. Wu et al., "Full-Bridge Three-Port Converters with Wide Input Voltage Range for Renewable Power Systems," IEEE Transactions on Power Electronics, Institute of Electrical and Electronics, vol. 27, No. 9, Sep. 30, 2012, pp. 3965-3974, XP011444462.
H. Tao et al., "Family of multipart bidirectional DC-DC converters," IEEE Proceedings: Electric Power Applications, Institution of Electrical Engineers, vol. 153, No. 3, May 3, 2006, pp. 451-458, XP006026473.

\* cited by examiner

MULTI-OUTPUT POWER CONVERTER WITH PHASE-SHIFT CONTROL

CROSS-REFERENCE TO RELATED APPLICATIONS

This application is a National Stage of International patent application PCT/EP2014/079361, filed on Dec. 29, 2014, which claims priority to foreign French patent application No. FR 1303118, filed on Dec. 31, 2013, the disclosures of which are incorporated by reference in their entirety.

FIELD OF THE INVENTION

The present invention concerns the field of DC/DC converters for converting DC signals into DC signals. The present invention more particularly concerns a multi-output power conversion circuit employing phase-shift control.

BACKGROUND

The invention can find its application in multi-voltage electrical networks such as for example those onboard transport means notably in the aeronautical, automotive or rail fields. These networks make it possible to supply power from a DC voltage source to various devices requiring different DC voltages.

The solutions currently proposed for producing such networks are generally based on Flyback or Forward type structures and the output voltages of the structure are regulated entirely by action on the semiconductors of the primary circuit. A disadvantage of these structures is that the voltages of the various outputs are linked and because of this only one output can be regulated. The interdependency of the voltages of the various outputs means that any load variation at one of the outputs has repercussions at the other outputs.

It is known in the prior art, notably from the publications "A current-fed three-port bi-directional DC-DC converter", by KRISHNASWAMI H ET AL (TELECOMMUNICATIONS ENERGY CONFERENCE, 2007. INTELEC 2007. 29TH INTERNATIONAL, IEEE, PISCATAWAY, N.J., USA—30 Sep. 2007) and "Family of multiport bidirectional DC-DC converters" by TAO H ET AL: (IEE PROCEEDINGS: ELECTRIC POWER APPLICATIONS, INSTITUTION OF ELECTRICAL ENGINEERS, GB, vol. 153, no. 3—3 May 2006). However, these two publications teach placing magnetic storage inductances in each bus. The inductances are therefore in the primary circuit and in the secondary circuit of the transformer. Because of the presence of the inductance in the primary circuit, the input voltage of the transformer is variable and depends on the power that is consumed. Thus a coupling is created between the various outputs and the latter can therefore not deliver different independent output voltage values.

SUMMARY OF THE INVENTION

An object of the invention is notably to correct one or more of the disadvantages of the prior art by proposing a solution making it possible to obtain, from a DC voltage source, a plurality of DC voltage sources each of the levels of which can be regulated independently of one another. Moreover, the activity of each of the output voltage sources must have a minimum impact on that of the adjacent outputs.

To this end, the invention consists in a multi-output power conversion circuit employing phase-shift control, receiving at the input a DC voltage and supplying at the output a plurality of DC voltages, including a transformer having an input and a plurality of outputs, said input being connected to an inverter including at least two switches and configured to convert a DC voltage into an AC voltage and each output being connected to a controlled rectifier configured to convert an AC voltage into a DC voltage, each controlled rectifier including a magnetic storage inductance connected to an AC to DC converter including at least two switches, the power conversion circuit further including a control module configured to generate phase-shifted control signals adapted to control the switching of the switches of the inverter and the controlled rectifiers, said control module being also configured to vary the phase shift between the control signals of the power switches of the inverter and those of each controlled rectifier in order to adjust the amplitude of the output voltages of the controlled rectifiers independently of one another.

In accordance with one embodiment, the input of the transformer is not connected to a magnetic storage inductance in order to have outputs totally independent of one another.

In accordance with one embodiment, the inverter is produced with a capacitive half-bridge structure.

In accordance with one embodiment, the inverter is produced with a full bridge structure.

In accordance with one embodiment, at least one controlled rectifier is produced with a capacitive half-bridge structure.

In accordance with one embodiment, at least one controlled rectifier is produced with a full bridge structure.

In accordance with one embodiment, the regulation unit of at least one controlled rectifier has an input to which is applied a signal making it possible to form the phase shift between the control signals of the switches of the inverter and those of said controlled rectifier.

In accordance with one embodiment, at least one secondary controlled circuit includes a filter capacitance.

The invention also consists in a multi-voltage electrical network including a multi-output power conversion circuit employing phase-shift control as described above and at least one DC voltage source, said conversion circuit being connected at its input to said voltage source and supplying at the terminals of its various outputs the various voltages of the network.

The invention also consists in a method of manufacturing a multi-output power conversion circuit employing phase-shift control characterized in that it includes a step of designing said circuit including a step of optimizing the value of a magnetic storage inductance, said dimensioning step including:

a step of defining a phase-shift range for which the output current of said conversion circuit is a substantially linear function of the phase shift, a step of reducing the width of said phase-shift range to reduce the current in the switches on switching the latter to a value close to zero, a step of estimating the value of the inductance from the phase-shift range.

BRIEF DESCRIPTION OF THE DRAWINGS

Other particular features and advantages of the present invention will become more clearly apparent on reading the following description given by way of nonlimiting illustration and with reference to the appended drawings, in which.

DETAILED DESCRIPTION

Figure 1:
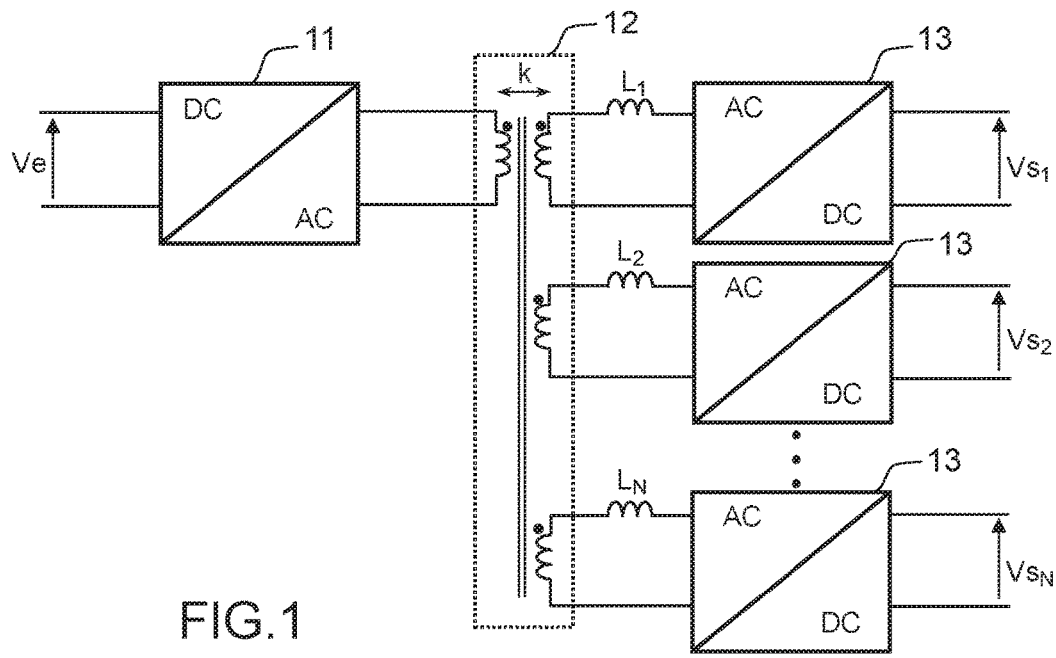
FIG. 1 represents an example of one embodiment of a multi-output power conversion circuit in accordance with the invention employing phase-shift control.

FIG. 1 represents diagrammatically an embodiment of a multi-output power conversion circuit employing phase-shift control.

The circuit may include a transformer 12 including an input including at least one primary winding and a plurality of outputs including at least one secondary winding. The transformer 12 may be a single-phase, three-phase or generally speaking multiphase transformer. In the case of a three-phase transformer 12 and more generally a multiphase transformer, the input and the output of that transformer 12 include a plurality of windings interconnected in various arrangements.

Figure 2:
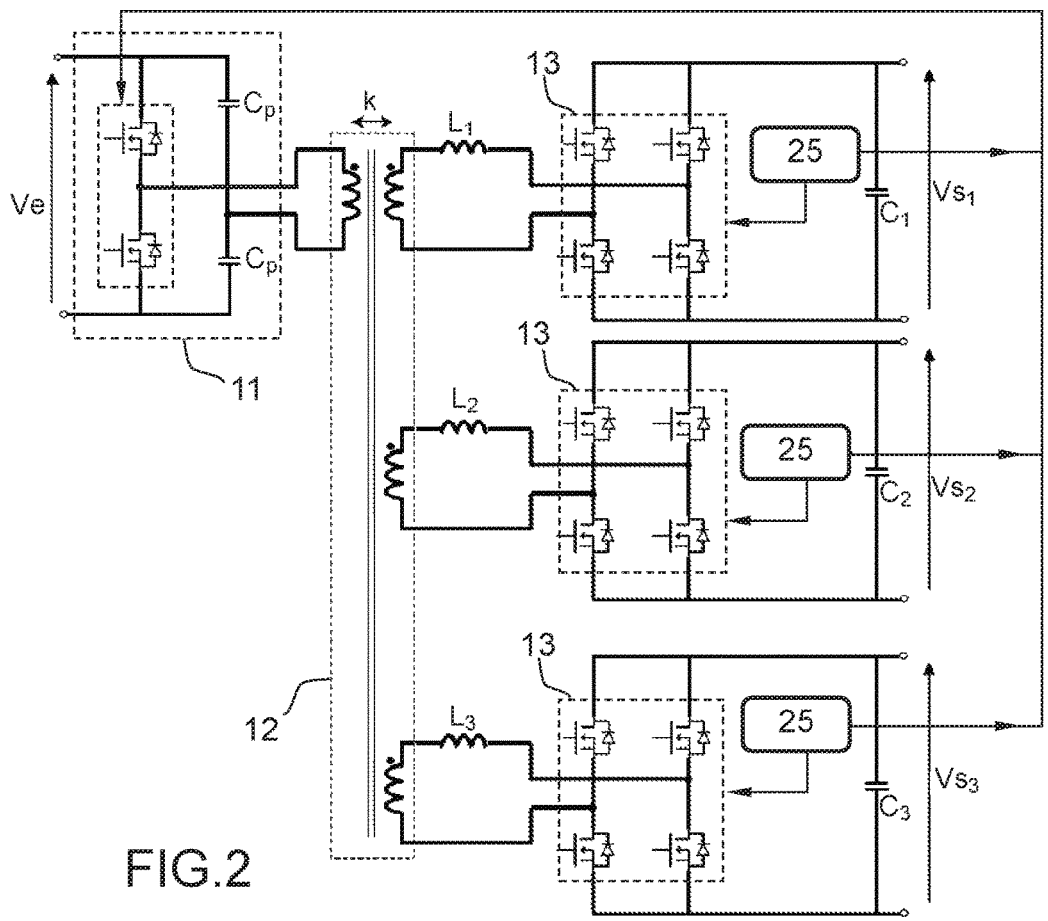
FIG. 2 represents one particular embodiment of a multi-output power conversion circuit in accordance with the invention employing phase-shift control.

The input of the transformer 12 may be connected to an inverter 11 converting a DC voltage Ve into an AC voltage. The inverter 11 may employ a power switch structure, for example using insulated gate bipolar transistors (IGBT) or metal oxide semiconductor (MOS) transistors connected in a bridge circuit. The inverter 11 may be produced with a capacitive half-bridge as shown in FIG. 2. In accordance with alternative embodiments, the inverter 11 may be produced with a full bridge structure with at least two arms.

Each output of the transformer 12 may be connected to a controlled rectifier 13 converting the AC output voltage of the transformer 12 into a DC voltage $Vs_1$, $Vs_2$ ... $Vs_N$. Connected in series between each controlled rectifier 13 and each output of the transformer 12 is a magnetic storage inductance $L_1$, $L_2$, $L_N$. The controlled rectifier 13 may employ a power switch structure, such as for example insulated gate bipolar transistors (IGBT) or metal oxide semiconductor (MOS) transistors connected in a bridge circuit. The controlled rectifier 13 may be produced with a capacitive half-bridge, a full bridge structure with at least two arms or any equivalent means.

The inverters 11 and the controlled rectifier 13 each include at least two power switches.

To control the various switches of the inverters 11 and the controlled rectifier 13, the multi-output power conversion circuit may include at least one control module 25 (see FIG. 2) configured to generate phase-shifted control signals adapted to control the switching of those switches. This control module 25 may be of the pulse width modulation type in order to vary the cyclic ratio of the control signals.

In accordance with one preferred embodiment, the control signals are generated with a cyclic ratio substantially equal to 50%.

In order to vary the phase shift between the control signals of the inverter 11 and a controlled rectifier 13, the control module 25 controlling those two circuits may for example include an input to which is applied a voltage the value of which makes it possible to define said phase shift.

The control module 25 may for example be produced with a controller, a microprocessor, a device including various logic circuits and comparators, an application-specific integrated circuit (ASIC) or any other equivalent means.

In accordance with one embodiment, at least one controlled rectifier may include a filter capacitance $C_1$, $C_2$, ..., $C_N$ in order to smooth the output signal of said controlled rectifier 13.

Placing a magnetic storage inductance at the level of the controlled rectifiers 13 and having no inductances in the primary circuit advantageously makes it possible to have secondary circuits totally independent of one another.

The voltage at the input terminals of the transformer 12 can therefore be distributed to the various secondary windings and create different voltage sources. Using the various control modules, those various sources can be transformed to adapt them to the required voltage and to supply power to various loads.

FIG. 2 represents one particular embodiment of the invention. In this embodiment, the inverter 11 includes a DC/AC converter employing a capacitive half-bridge. Each switch includes an insulated gate bipolar transistor in parallel with a freewheel diode. This converter converts a DC voltage Ve into an AC voltage fed to the input of a multi-output transformer 12 (which, in FIG. 2, given by way of nonlimiting example, has three outputs).

Each circuit connected to the output of the transformer 12 includes a magnetic storage inductance $L_1$, $L_2$, $L_3$ connected in series with an AC/DC converter 13 employing switches connected in a complete bridge circuit. As before, each switch may include an insulated gate bipolar transistor in parallel with a freewheel diode.

Each AC/DC converter 13 is connected to a control module 25 configured to control the switching of the switches of said converter. Each control module 25 is also connected to the DC/AC converter 11 in order to control the switching of those switches. Each control module 25 makes it possible to define the phase shift between the control signals of the inverter 11 and each controlled rectifier 13.

Each control module 25 is configured to vary the phase shift between the control signals of the power switches of the inverter 11 and those of each controlled rectifier 13 in order to adjust the amplitude of the output voltages of the controlled rectifiers 13 independently of one another.

In accordance with one particular embodiment, if the inverters 11 and/or the rectifier 13 were to be produced with a complete bridge structure, the control module could generate a phase shift between the control signals of the switches of the two arms.

In this particular embodiment, each output of the multi-output power conversion circuit includes a filter capacitance $C_1$, $C_2$, $C_3$ connected to the terminals of the converter 13 and configured to filter the output voltages of said converter 13.

In accordance with one embodiment, at least one control module 25 is configured to vary the phase between the control signals of the power switches of the inverter 11 and a controlled rectifier 13 and thus to adjust the amplitude of the output voltage of the controlled rectifier 13 controlled by said control module 25. Depending on the phase shift applied to the control signals of the switches of the inverter 11 and the controlled rectifier 13, either a voltage raising circuit or a voltage attenuating circuit may be produced. The same circuit may therefore be used to implement both functions.

Figure 3:
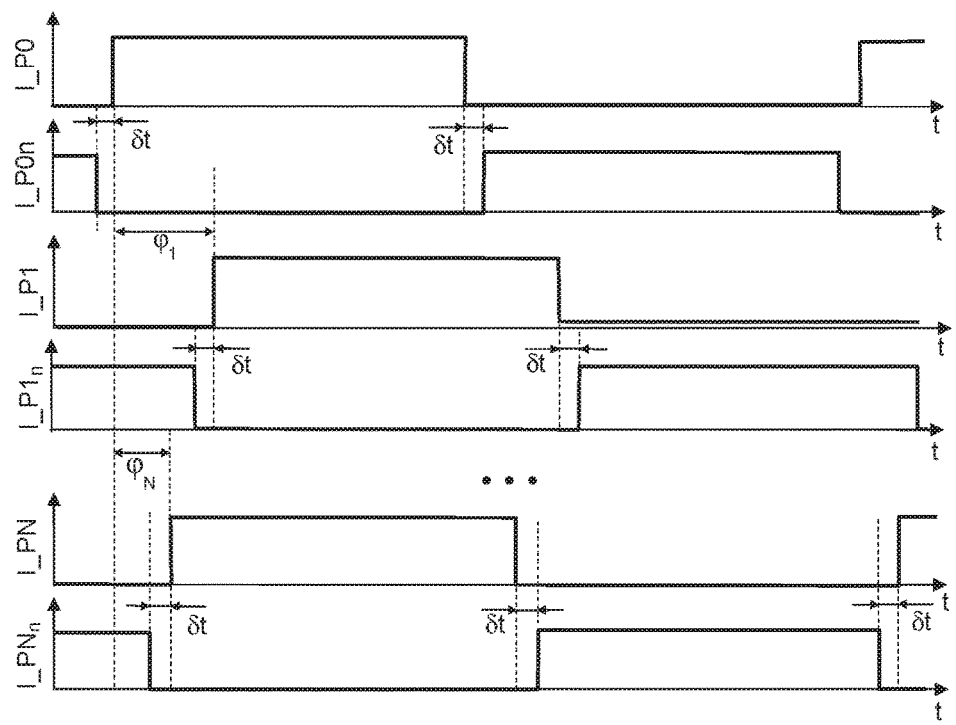
FIG. 3 represents by means of timing diagrams an example of control signals for the circuit from FIG. 2.

By way of illustration, FIG. 3 shows examples of control signals for controlling the switches of the controlled rectifiers 13 and the inverter 11 of the circuit from FIG. 2 and controlling by phase-shift each output of the multi-output power conversion circuit. In this embodiment, each of the signals I_P0, I_P1, . . . , I_PN has a cyclic ratio of 50%. The signals I_P0n, I_P1n, . . . , I_PNn are the complements of the signals I_P0, I_P1, . . . , I_PN ignoring the dead times δt. In known manner, these dead times make it possible to take account of the switching times of the power switches and thus to avoid short circuits.

The signals of the first two timing diagrams I_P0 and I_P0n correspond to controlling the inverter 11. They make it possible to define the phase reference. The 2N signals of the following timing diagrams I_P1 and I_P1n, I_P2 and I_P2n, . . . , I_PN and I_PNn correspond to the control signals of the switches of the controlled rectifiers 13 of the secondary circuit. These signals make it possible to define the phase shifts $\varphi_1, \varphi_2, \ldots, \varphi_N$ between the inverter 11 and each controlled rectifier 13.

The conversion structure in accordance with the invention employing phase-shift control advantageously makes possible the production of a multi-output converter with a single primary circuit and a single transformer. Each of the secondary circuits can be regulated independently of the others and with a different ground reference.

The invention can find its application in multi-voltage electrical networks. These networks may for example be onboard terrestrial, air and/or maritime transport means.

The multi-voltage electrical network may include at least one DC voltage source connected to the input of a multi-output power conversion circuit employing phase-shift control as described above, the various voltages feeding said multi-voltage network being obtained at the terminals of said conversion circuit.

Figure 4:
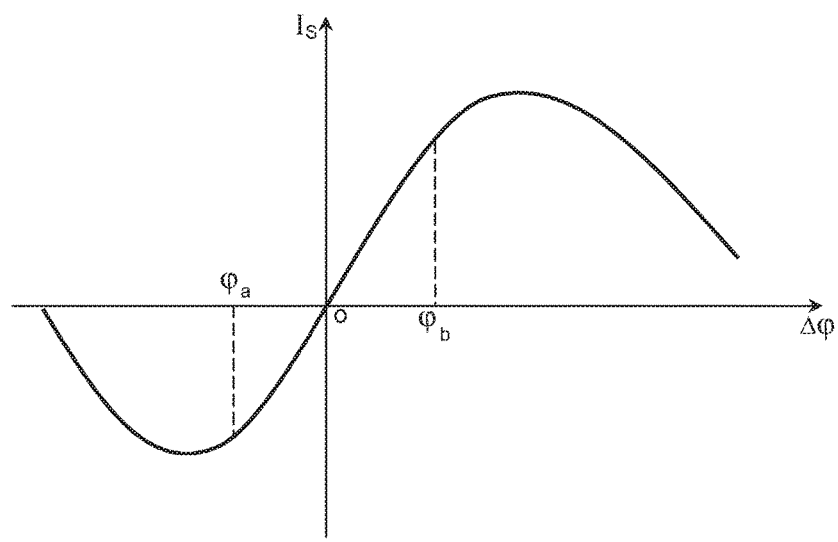
FIG. 4 represents an example of the trend of the mean output current of the multi-output converter relative to the phase shift between the inverter and a controlled rectifier.
Figure 5:
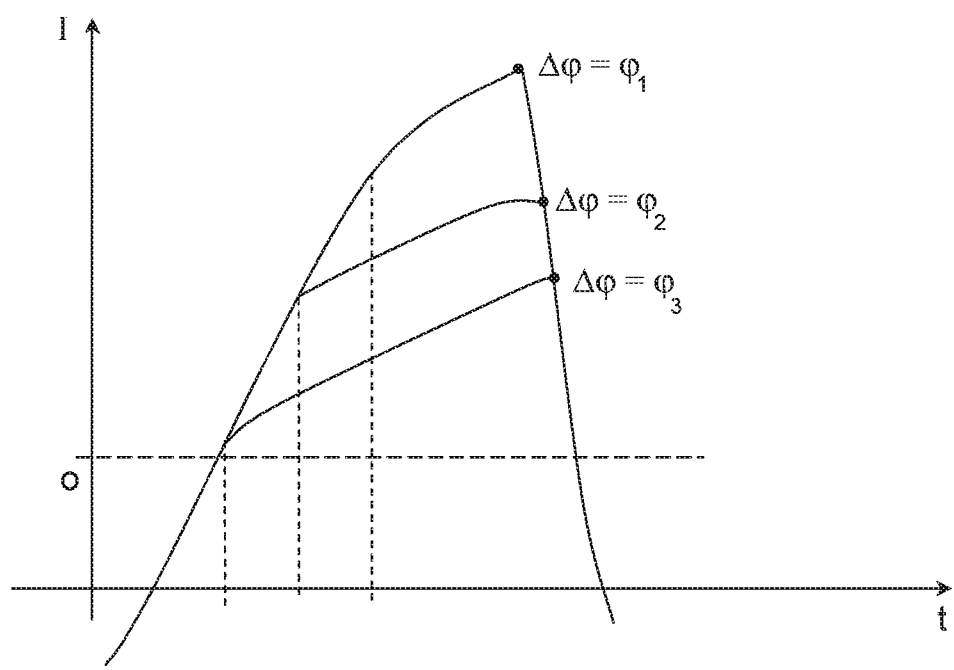
FIG. 5 represents an example of the trend of the current flowing through the switches when they are switched.

Referring to FIGS. 4 and 5, a method of optimizing the value of the magnetic storage inductance L of a controlled rectifier 13 will be described.

FIG. 4 represents the trend of the mean output current Is of a controlled rectifier 13 as a function of the phase shift Δφ applied between the control signals of the switches of said rectifier 13 and those of the inverter 11. The graphical representation of that current takes the form of a sinusoid. To implement the regulation, it is beneficial to operate at the level of a substantially linear portion of the curve such as that between the phases φa and φb, for example. A range of phase variation or an operating range is therefore chosen making it possible to have a substantially linear variation of the current as a function of the phase shift applied between the inverter 11 and the controlled rectifier 13. In known manner, fixing the operating range makes it possible to fix a value of the inductance.

FIG. 5 shows the waveform of the current at the level of a switch at the time of switching the latter as a function of the phase for various values $\varphi_1, \varphi_2, \varphi_3$ of the phase shift Δφ applied between the inverter 11 and the controlled rectifier 13. Note that modifying the value of the phase shift between the control signals of the switches of the inverter 11 and those of the controlled rectifier 13 also modifies the peak value of the current and the maximum value of this current is higher or lower. Accordingly, when the switch is going to switch, it will break a higher or lower current depending on the phase shifts applied. In order to reduce the current in the switches at the time of switching the phase shift range is reduced.

The second step of the optimization process consists in reducing the value of the width of the operating range so that the current at the terminals of the switches is close to zero at the moment the latter switch in order to achieve zero current switching (ZCS). The next step will consist in deducing the value of the magnetic storage inductance L from that range using standard formulas known to the person skilled in the art.

Using an inductance value L degraded relative to the situation where an operating range of 90° would be covered advantageously makes it possible to operate in a zone in which the output current is a substantially linear function of the phase shift and to effect zero crossing switching. Moreover the fact that the value of the inductance L is reduced makes it possible to reduce the number of turns of the latter and therefore the losses in said inductance.

The invention claimed is:

1. A multi-output power conversion circuit employing phase-shift control receiving at an input a DC voltage and supplying at an output a plurality of modulatable DC voltages,
said conversion circuit including a transformer having an input and a plurality of outputs, said input being connected to an inverter including at least two switches and configured to convert a DC voltage into an AC voltage and each output being connected to a controlled rectifier configured to convert an AC voltage into a DC voltage,
each controlled rectifier including a magnetic storage inductance connected to an AC to DC converter including at least two switches, and
said power conversion circuit further including a control module configured to generate phase-shifted control signals adapted to control a switching of the switches of the inverter and of each of the controlled rectifiers separately;
wherein the phase shifts between the control signals of the switches of the inverter taken as a common phase reference and those of the switches of each controlled rectifier being controlled independently from one another so that an amplitude of the output voltage of each controlled rectifier can be adjusted independently.

2. The circuit as claimed in claim 1 wherein the input of the transformer is not connected to a magnetic storage inductance in order to have outputs totally independent of one another.

3. The circuit as claimed in claim 1 wherein the inverter is implemented with a capacitive half-bridge structure.

4. The circuit as claimed in claim 1 wherein the inverter is implemented with a full bridge structure.

5. The circuit as claimed in claim 1 further comprising a regulation unit of at least one controlled rectifier that has an input to which is applied a signal making it possible to form the phase shift between the control signals of the switches of the inverter and the switches of said controlled rectifier.

6. The circuit as claimed in claim 1 further comprising at least one secondary controlled circuit that includes a filter capacitance.

7. A multi-voltage electrical network comprising a multi-output power conversion circuit employing phase-shift control as claimed in claim 1 and at least one DC voltage source, said conversion circuit being connected at its input to said voltage source and supplying at the terminals of its various outputs various voltages of the network.

8. A method of manufacturing a multi-output power conversion circuit as claimed in claim 1, said method comprising a step of design, including a dimensioning step intended to determine a value of a magnetic storage inductance of each of the controlled rectifiers, said dimensioning step including:

a step of defining a phase-shift range for which an output current of the considered controlled rectifiers is a substantially linear function of the phase shift applied to said controlled rectifier, a step of reducing a width of said phase-shift range to reduce a current in the switches of said controlled rectifier, on switching the latter, to a value close to zero, and a step of estimating the value of the inductance of said controlled rectifier from a reduced phase-shift range.

9. The circuit as claimed in claim 1 wherein a controlled rectifier comprises at least two switches.

10. The circuit as claimed in claim 9 wherein at least one controlled rectifier includes a capacitive half-bridge structure.

11. The circuit as claimed in claim 9 wherein at least one controlled rectifier includes a full bridge structure.

* * * * *